(12) United States Patent
Stokke et al.

(10) Patent No.: US 9,027,586 B2
(45) Date of Patent: May 12, 2015

(54) PIPELINE FOR TRANSPORT OF GAS

(75) Inventors: Jørn Yngve Stokke, Stavanger (NO); Gjertrud Elisabeth Hausken, Stavanger (NO)

(73) Assignee: Statoil Petroleum AS, Stavanger (NO)

( * ) Notice: Subject to any disclaimer, the term of this patent is extended or adjusted under 35 U.S.C. 154(b) by 986 days.

(21) Appl. No.: 12/594,300

(22) PCT Filed: Apr. 2, 2008

(86) PCT No.: PCT/NO2008/000121
§ 371 (c)(1),
(2), (4) Date: Dec. 22, 2009

(87) PCT Pub. No.: WO2008/121002
PCT Pub. Date: Oct. 9, 2008

(65) Prior Publication Data
US 2010/0101667 A1 Apr. 29, 2010

(30) Foreign Application Priority Data

Apr. 3, 2007 (NO) .................................. 20071773

(51) Int. Cl.
*F16K 31/12* (2006.01)
*F17D 1/04* (2006.01)
*G05D 7/06* (2006.01)

(52) U.S. Cl.
CPC ............... *F17D 1/04* (2013.01); *G05D 7/0617* (2013.01)

(58) Field of Classification Search
CPC ......... G05D 7/0617; F17D 1/04; F04B 49/02; F04B 49/065; F04B 51/00

USPC .............. 137/487.5, 565.13, 613, 614.11; 73/861.351, 864.63; 417/1–47
See application file for complete search history.

(56) References Cited

U.S. PATENT DOCUMENTS

| | | | |
|---|---|---|---|
| 3,085,423 A * | 4/1963 | Champion | 73/40.5 R |
| 4,032,259 A * | 6/1977 | Brown | 417/43 |
| 4,200,120 A * | 4/1980 | Kimata et al. | 137/613 |
| 4,204,808 A * | 5/1980 | Reese et al. | 417/2 |
| 4,468,171 A * | 8/1984 | Katsumata et al. | 417/53 |
| 4,526,513 A * | 7/1985 | Bogel | 417/56 |
| 5,139,044 A | 8/1992 | Otten et al. | |

(Continued)

FOREIGN PATENT DOCUMENTS

| | | |
|---|---|---|
| DE | 3327590 | 2/1985 |
| FR | 2 864 202 | 6/2005 |

OTHER PUBLICATIONS

International Search Report issued Jun. 26, 2008 in International (PCT) Application No. PCT/NO2008/000121.

(Continued)

*Primary Examiner* — Matthew W Jellett
(74) *Attorney, Agent, or Firm* — Wenderoth, Lind & Ponack, L.L.P.

(57) ABSTRACT

In a pipeline for transportation of gas, the supplying pressure for the gas out through an outlet shall not exceed a threshold value. The pipeline has a safety unit with a pressure transmitter and a temperature transmitter arranged in connection to the pipeline close to an inlet of the pipeline. The safety unit comprises a device for measuring the flow rate and the safety unit is either used for maintaining an increased inlet pressure to the pipeline and/or in order to use a pipeline with a reduced inner diameter within a given safety level against leakage and excessive pressure.

7 Claims, 1 Drawing Sheet

(56) References Cited

U.S. PATENT DOCUMENTS

| | | | |
|---|---|---|---|
| 5,269,660 A * | 12/1993 | Pradelle | 417/18 |
| 5,954,089 A * | 9/1999 | Seymour | 137/487.5 |
| 6,889,706 B2 * | 5/2005 | Fukano et al. | 137/487.5 |
| 7,131,456 B2 * | 11/2006 | Kang et al. | 137/487.5 |
| 2001/0032674 A1 | 10/2001 | Brunet et al. | |
| 2002/0041807 A1 * | 4/2002 | Forthuber et al. | 417/22 |
| 2005/0246112 A1 | 11/2005 | Abhulimen et al. | |
| 2007/0284112 A1 | 12/2007 | Magne et al. | |
| 2011/0240157 A1 * | 10/2011 | Jones et al. | 137/613 |

OTHER PUBLICATIONS

Patent Cooperation Treaty (PCT) Written Opinion of the International Search Authority (in English language) issued Mar. 9, 2009 in International PCT) Application No. PCT/NO2008/000121.

Patent Cooperation Treaty (PCT) International Preliminary Report on Patentability (in English language) issued Mar. 9, 2009 in International PCT) Application No. PCT/NO2008/000121.

* cited by examiner

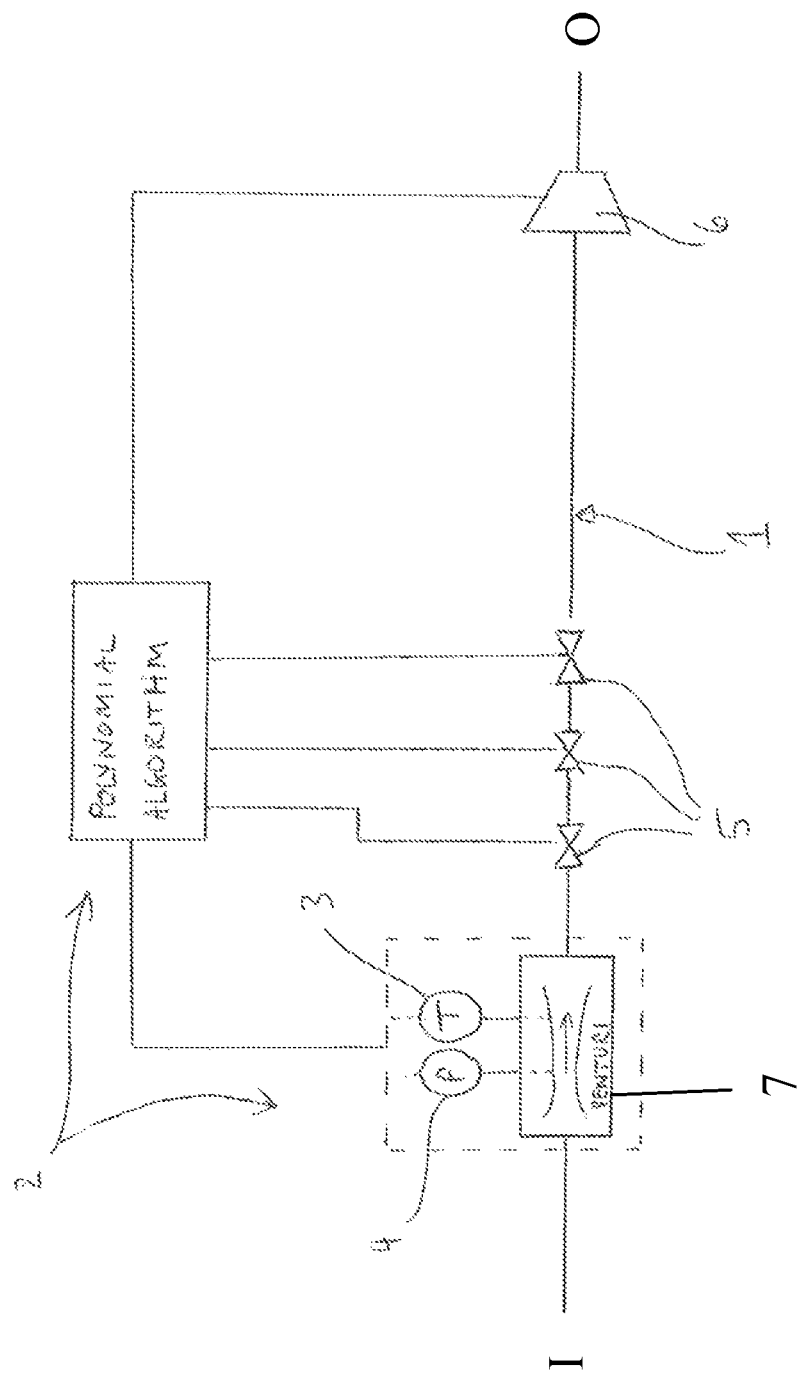

PIPELINE FOR TRANSPORT OF GAS

FIELD OF THE INVENTION

The current invention relates to pipelines for transportation of gas. More precisely, the invention relates to gas pipelines that shall be operated within a given safety level against excessive pressure and gas leakage from the pipeline, even though the pipeline is connected to a pressure source that may over-pressurize the pipeline in relation to the pipeline's design code.

BACKGROUND AND PRIOR ART OF THE INVENTION

The authorities instruct operators of gas pipelines to operate the lines so that the risk of a gas leakage during a one-year period lies within a given safety level. The authorities' required instructions will vary from country to country, but will in all cases impose instructions as to how a gas pipeline shall operate. A typical safety level is that the yearly probability of a leakage and to exceed a given pressure within a margin of 2 bar, shall be less than $1 \times 10^{-3}$, total for all sources for high pressure and all incidents, which may occur during the operation of the pipeline. In order to comply with the instructions, a safety device or safety unit is arranged in connection with the pipeline. The components, which may be used in connection with the safety device, must be approved by the authorities to have a reliability that meets the safety level. A crucial consideration in connection with the current invention is that the gas pipeline and all of the equipment determining safety must be within a given total safety level, which is why it is not relevant to use methods or components that are not approved for that safety level. There are a number of process control systems and leakage detection systems which are not useful in relation with a safety device in connection to a gas pipeline.

Prior known safety devices for gas pipelines make use of pressure and temperature measurements. There are no previously known safety devices which also make use of measuring the flow rate at the inlet of the gas pipeline. The gas' compressibility does not provide an immediate correlation between the flow rate, pressure and temperature in to the pipeline in relation to what is transmitted out of the pipeline. This is why safety devices suitable for a liquid conducting pipeline are not functional for a gas conducting pipeline.

In a typical instance, the gas pipeline shall be connected to an existing pipeline system, and the supplying pressure for the gas from the pipeline through an outlet must not exceed a given threshold value, decided by requirements given for the receiving pipeline system. The connecting of the pipeline and the pipeline system is typically carried out with a so-called hot tap connection. There is a need for a gas pipeline, which is particularly suitable for connecting to an existing pipeline system in accordance with the requirements as mentioned above.

SUMMARY OF THE INVENTION

The above mentioned need is met by the invention providing a gas pipeline comprising an inlet and an outlet, the pipeline being for connecting to an existing pipeline system and for supplying gas to the pipeline system through the outlet, characterised in that the pipeline further comprises a safety unit arranged close to the inlet, the safety unit comprising a device for measuring pressure inside or close to the inlet, a device for measuring temperature inside or close to the inlet and a device for measuring flow rate inside or close to the inlet, the safety unit being operable to estimate a pressure at the outlet based on measurements of the pressure, temperature and flow rate inside or close to the inlet from the measuring devices, thereby enabling the pressure of gas supplied from the pipeline to the pipeline system through the outlet to be maintained below a predetermined threshold value.

An embodiment of the present invention provides a pipeline for transportation of gas, for which the supplying pressure for the gas out through an outlet shall not exceed a threshold value, where the pipeline comprises a safety unit with a pressure transmitter and a temperature transmitter arranged in connection to the pipeline close to an inlet of the pipeline, and where the safety unit comprises a device for measuring the flow rate and the safety unit is either used for maintaining an increased inlet pressure to the pipeline and/or in order to use a pipeline with a reduced inner diameter, within a given safety level against leakage and excessive pressure.

The term "a given safety level against leakage and excessive pressure" refers to the supply pressure for gas transmitting out from the pipeline through an outlet not exceeding a threshold value, and that there must be no leakage from the pipeline within a given probability as defined by the safety level. In a preferred operational form of the invention, the safety level is such that the yearly probability for exceeding a given supplying pressure at the outlet, within a margin typically of 2 bar, taking into account all pressure sources, incidents and leakage from the pipeline itself, shall be less than $1 \times 10^{-3}$, more preferable less than $1 \times 10^{-5}$.

In a preferred operational form the arrangement for measuring the flow rate is a venturi tube, placed inside or close to an inlet of the pipeline. In a preferred operational form, the safety device is controllably connected to at least two emergency shutdown valves in series within the pipeline, close to or inside the inlet of the pipeline. The safety device is operated in accordance with an algorithm which calculates the outlet pressure from the pipeline solely based on measurements of the pressure, temperature and flow rate inside or close to the inlet of the pipeline.

With the current invention achievement is made in that an existing gas pipeline can increase its capacity or a new pipeline can be constructed with a smaller inner diameter than previously, when compared with previous gas pipelines with a safety device. This has a significant technical and economical advantage for the operator of gas pipelines and operators of related field and pipeline systems.

DRAWINGS

Example embodiments are described below with reference to the accompanying drawing, FIG. 1, which shows a gas pipeline.

DETAILED DESCRIPTION

A gas pipeline according to the present invention comprises, in particular, the following features described with reference to the accompanying drawing FIGURE. As can be seen from FIG. 1, a gas pipeline 1 has an inlet designated by I at the left hand side thereof as seen in the FIGURE and an outlet O for connection to an existing pipeline system at the right hand side thereof. A safety unit 2 is operable in accordance with an algorithm as described below and is connected in or close to the inlet of the gas pipeline 1. A device 3 is provided for measuring temperature, a device 4 is provided for measuring pressure and a venturi 7, for example, is provided for measuring flow rate of the gas through the pipeline 1. A polynomial algorithm, for example, receives the signals of pressure, temperature and flow rate and outputs valve control signals to emergency shutdown valves 5 provided in the pipeline 1. The polynomial algorithm also provides as an output a set point for compressor 6, for example a gas compressor that delivers the gas to the existing pipeline system.

The device for measuring the flow rate 7 may be approved for fiscal measuring, if it is verified reliable to be enough, in addition to being precise and reliable in relation to the determined safety level. There are ultra sound based fiscal flow rate meters for gas, there are coriolis meters usable for the same purpose and there are differential pressure meters based on a narrow part of the gas pipeline, such as with a venturi tube. It is only devices with venturi tubes which at the moment are within the safety level needed to be observed in the North Sea. The pressure transmitter, temperature transmitter or flow rate transmitter in connection with the venturi tube is connected to the safety device, as is the pressure transmitter in connection with the gas pipeline, which is also connected to the safety device. The flow rate may be given directly from the venturi tube or determined by the safety device. The safety device is connected to at least two, preferably at least three emergency shutdown valves in series inside the gas pipeline, in or close to its inlet. Furthermore, the safety device is advantageously connected to a gas turbine or another source for pressure to the gas pipeline, so that a set point for the source is adjustable by means of signals from the safety device. By means of a suitable algorithm the safety device considers the transient behaviour of the gas inside the gas pipeline. It is therefore possible to maintain the given safety level without the need for a comprehensive instrumental system with measurements at the inlet of the gas pipeline and along the gas pipeline itself. This in itself saves a significant cost. All the elements inside the gas pipeline, the safety device and the connecting devices may in themselves be known, but it is the combination of these in a safety device for the operation of the gas pipeline within a given safety level which provides a surprising technical effect. It is possible to increase the capacity of the existing pipeline since a higher inlet pressure for the gas may be used. It is possible to reduce the diameter for new gas pipelines, which will result in major savings on investment costs. It is possible to have a combination of some increased inlet pressure and some reduced inner diameter inside the gas pipeline within the total safety level.

The algorithm which the safety device uses may, as previously mentioned, be known. The algorithm however, must be adjusted to the relevant parameters, including the parameters for the gas pipeline in each case. Flow programs, such as OLGA and HySYS should be used to simulate the algorithm functionality during different operational situations, including blocking by, for instance, hydrates inside the gas pipeline, and substantial increase of the flow rate, to verify that the maximum permitted pressure inside the pipeline in relation to the design code and the maximum permitted outlet pressure from the pipeline are not exceeded. The algorithm must be verified so that unnecessary shutdown from the safety device is avoided, at the same time that the shutdown taking place should not result in excessive pressure inside the pipeline in relation to either the design code or the outlet pressure within the given safety level. The algorithm is typically built around polynomial expressions for the flow rate, pressure and temperature within given permanent dimension and with the adjustment of the parameters over time within given limits.

A description of the safety systems and safety devices relevant to the current invention can be found in the document DnV OS-F101. The existing safety systems are based on redundant downstream pressure measurements and triple redundancy for telemetry, pipelines with full design pressure over the full length or a large pipeline diameter to avoid that the exporting pressure is higher than acceptable for the existing pipeline systems downstream.

The existing pipeline systems are becoming more and more complex with constantly new branch lines being connected. Complex telemetry and complex reliability assessments prevent further development of the transport network in the form of pipeline systems. The current invention introduces a reliable flow rate measurement together with an existing safety system. This provides several advantages, whereas it is mentioned that the pressure at a weak point in a gas pipeline is as accurately as possible estimated by the safety system instead of measuring the pressure. Furthermore, underwater pressure measurement at the connecting point is not necessary. Moreover, comprehensive telemetry arrangements are avoided, which is also cost effective. For the existing transporting system, the export pressure inside the pipeline can be increased to above the maximum pressure permitted in the fitted downstream pipeline system and thereby increase the export of the gas through the pipeline. For new systems the pipeline's inner diameter may be reduced, which reduces significantly the need for investments.

EXAMPLE

A gas pipeline with a length of 130 km is planned from the semi-submerged platform Gjøa to the pipeline system FLAGS. Connecting to FLAGS will be through a hot-tap together with the pipeline Tampen Link. The gas is then sent to St.Fergus in Great Britain for further processing and delivery to customers. By using a pipeline for gas transport with a safety device in accordance to the current invention the inner flow cross section of the pipeline may be reduced by 20%, for example from 720 millimeters to 660 millimeters in inner diameter. This will result in a saving on the pipeline itself of NOK 95 mill. Provided that this is operationally sensible for Gjøa and adjoining sectors, then the inner pipeline diameter of 720 millimeters alternatively may be maintained whilst the flow rate through the pipeline is increased, whereas the exported quantity of gas may be increased by 15%. Alternatively, the inner diameter may be slightly reduced, whilst the exported quantity of gas is slightly increased within the given safety level.

The technical effect of the invention will vary a great deal and must be calculated for each case. Should the value of increased gas export and/or reduced pipeline diameters exceed the investment in an arrangement of a pipeline according to the present invention, then the invention represents an economical advantage.

The invention claimed is:

1. A gas pipeline having an inlet and an outlet, the gas pipeline being arranged to conduct gas flow from the inlet towards the outlet, the gas pipeline being for connection to an existing pipeline system and for supplying gas to the existing pipeline system through the outlet, comprising a safety unit arranged close to the inlet, the safety unit comprising a device for measuring pressure inside or close to the inlet, a device for measuring temperature inside or close to the inlet and a device for measuring flow rate inside or close to the inlet, the safety unit being operable to calculate a pressure at the outlet based on measurements of the pressure, temperature and flow rate inside or close to the inlet from the devices, wherein the safety unit is connected to at least two emergency shutdown valves provided in series inside the gas pipeline in or close to the inlet, wherein the safety unit is arranged to maintain the pressure of gas supplied from the pipeline to the existing pipeline system through the outlet to be maintained below a predetermined threshold value by closing the at least two emergency shutdown valves if the pressure at the outlet is expected to exceed the predetermined threshold value based on the calculated pressure at the outlet.

2. The pipeline according to claim 1, wherein the device for measuring the flow rate comprises a venturi tube.

3. The pipeline according to claim 1, wherein the safety unit is operated in accordance with an algorithm which considers transient behaviour of the gas.

4. The pipeline according to claim 1, wherein the safety unit has input measurable parameters that include the pressure, temperature and flow rate at the inlet of the pipeline and output parameters that include a set point to a gas compressor delivering gas to the gas pipeline and control signals for three emergency shutdown valves arranged in series in or close to the inlet of the pipeline.

5. The pipeline according to claim 1, wherein the safety unit is connected to a gas turbine or other source for pressure to the gas pipeline, with the turbine or other source being adjustable by signals from the safety unit.

6. The pipeline according to claim 1, wherein the safety unit is operated in accordance with an algorithm built around polynomial expressions for the flow rate, pressure and temperature.

7. The pipeline according to claim 1, wherein the safety unit is connected to the at least two emergency shutdown valves so as to output valve control signals thereto.

* * * * *